Patented Sept. 16, 1924.

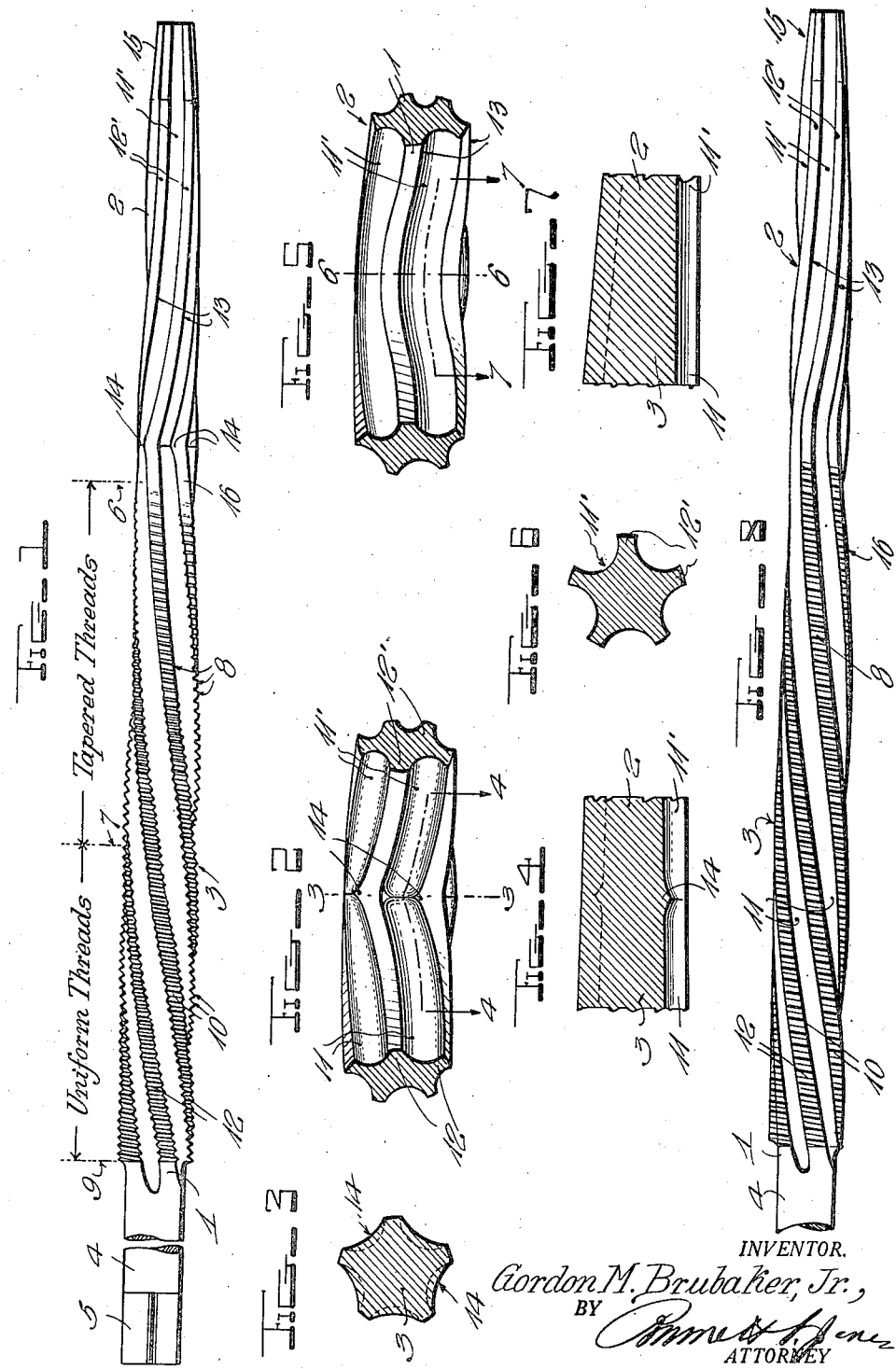

1,508,595

UNITED STATES PATENT OFFICE.

GORDON MARK BRUBAKER, JR., OF MILLERSBURG, PENNSYLVANIA, ASSIGNOR TO W. L. BRUBAKER & BROS. COMPANY, OF MILLERSBURG, PENNSYLVANIA.

METHOD OF MAKING STAY-BOLT TAPS.

Application filed January 24, 1924. Serial No. 688,233.

*To all whom it may concern:*

Be it known that I, GORDON MARK BRUBAKER, Jr., a citizen of the United States, residing at Millersburg, in the county of Dauphin and State of Pennsylvania, have invented new and useful Improvements in Methods of Making Stay-Bolt Taps, of which the following is a specification.

My invention relates to a method of making staybolt taps of the general type disclosed in my prior Patent No. 1,434,870, dated November 7, 1922, and of the particular type disclosed in my copending application filed Jan. 24, 1924, Serial No. 688,232, both relating to a staybolt tap having a forward reaming portion and a rear threading portion, said threading portion being composed of tapered cutting threads and uniform finishing threads, and said tap being provided with spiral clearance grooves or flutes forming spiral ribs, the ribbed portions of the reamer part being provided with the reamer cutting edges and the ribbed portions of the tap part with the aforementioned threads. In the patented structure referred to, the grooves or flutes and the ribs of the reaming and tap portions extend on continuous spiral curves in the same direction, a construction which has been found to be somewhat objectionable under certain conditions in simultaneously reaming an inside boiler sheet and tapping an outside boiler sheet, owing to the flow of the chips formed by both cutters in the same direction along the flutes of the tool. In the construction shown in my copending application, Serial No. 688,232, this objection is overcome by having the flutes and ribs of the reaming and tap portions extending spirally in reverse directions as therein fully described.

The object of the present invention is to provide a simple, convenient and inexpensive method of making a staybolt tap of the type disclosed in my said copending application Serial No. 688,232.

In the accompanying drawing,—

Figure 1 is a side elevation of the tap as it appears when partly completed and prior to the finishing steps.

Figure 2 is a similar view of a portion of the incomplete tap as shown in Figure 1, on an enlarged scale.

Figure 3 is a cross-section taken substantially on line 3—3 of Figure 2.

Figure 4 is a longitudinal section taken substantially on line 4—4 of Figure 3.

Figure 5 is a view similar to Figure 2 through the same portion of the tap as it appears after the fluted ridges have been ground out.

Figure 6 is a cross-section taken substantially on the line 6—6 of Figure 5.

Figure 7 is a longitudinal section taken substantially on line 7—7 of Figure 6.

Figure 8 is a view of the completed tap with the threads thereof illustrated diagrammatically.

The completed staybolt tap embodying my invention, shown fully in Figure 8 and fragmentarily in Figures 5 to 7, inclusive, comprises a shank 1 provided with the forward reamer portion 2, the intermediate tap portion 3, and the rear tang portion 4, said tang portion having the usual angular end or head 5 by means of which it may be turned. As shown, the tap portion 3 has two threaded surfaces, to wit, a forward threading cutting surface extending between the points 6 and 7 and composed of tapered threads 8, and a rear threaded finishing surface extending between the points 7 and 9 and composed of uniform threads 10, said threading surfaces intersecting at the point 7. Also as shown, the reamer portion 2 extends from the extreme forward end of the tool to a point adjacent the point 6, and the shank tapers from the point 7 to such extreme forward end of the tool.

The shank is formed with longitudinal flutes or grooves 11—11', producing the spiral ribs 12—12', on which ribs 12 the threads 8 and 10 are formed. Each groove 11 of the threading portion is continuous with a groove 11' of the reaming portion, and each rib 12 of the threading portion is also continuous with a rib 12' of the reaming portion. The grooves 11—11' and ribs 12—12' thus extend the full distance from the forward end of the tool to the point of intersection 9 between the working portions of the shank and the tang 4, the grooves providing clearance channels for the reception and discharge of the chips from both the reaming and threading cutters, and the edges 13 of the ribs 12' forming the acting reaming cutters. In the use of the tool, the reamer portion is employed to ream out the hole which is to be threaded, which operation is followed by the coarse cutting of the threads by the tapered threading surface 8 and the finishing of the threads by the uniform threading surface 10.

The grooves 11—11' and ribs 12—12' of the tap as thus constructed are continuous with each other throughout the length of the working portions of the tool, but the grooves 11 and ribs 12 extend spirally in one direction, while the grooves 11' and ribs 12' extend spirally in the reverse direction, in accordance with the structure set forth in my aforesaid copending application Serial No. 688,232. In practice the grooves and ribs of the threading portion may be left hand grooves and ribs, while the grooves and ribs of the reaming portion may be right hand grooves and ribs, or the reverse may be the case.

The present invention is directed to a novel manner of making a staybolt tap of this construction, whereby an economical and practical mode of manufacture is furnished. In this method of manufacture the tap is blanked out from a bar of steel and then headed and threaded. After the tap is threaded, the thread is machined, and then the tap is milled with a right hand spiral on the reamer part, thus producing the grooves 11' and ribs 12', after which the tap is milled with a left hand spiral along the threaded or tap portion proper, thus producing the grooves 11 and ribs 12. This milling is carried out in such manner as to cause the grooves or flutes of the reaming and tap portions to intersect or merge together at the point of joinder of the reaming portion with the threading portion. At this point in the reverse spiral milling cuts, where each groove 11 and continuing groove 11' intersect each other, an upstanding ridge or fin 14 is left at the marginal points of cut. These ridges are then removed in any suitable manner, as by grinding, in order to make the grooves of full depth at their points of intersection, thus making each continuous groove, formed of a groove 11 and companion groove 11', of like width and depth throughout, and providing at this point an easy curve for the flow of the chips from one groove portion to the other. In other words, this grinding operation makes the hook and rake the same throughout the entire length of the flute of the tap. Finally, the tapered lead portions 15 and 16 may be ground on the reaming and tap portions 2 and 3, and the tap given such finishing grindings as may be necessary, then hardened and otherwise treated so as to put it in as desirable a shape as required for shipment as a market product.

The method of manufacture above described adapts a combined reamer and tap of the structure set forth to be produced without manufacturing difficulties, enabling a superior article to be made in an easy, rapid and convenient manner.

By this method there is produced a staybolt tap having a reaming portion extending spirally in one direction and a tap portion extending spirally in the reverse direction, whereby the chips formed by the reamer are caused to flow along the reamer flutes in one direction for discharge and the chips formed by the tap portion are caused to flow in the tap flutes in the opposite direction and discharged, preventing the chips from the reamer from clogging the tap flutes and causing resistance to the working of the tap portion, with the advantages fully set forth in my aforesaid application Serial No. 688,232.

Having thus fully described my invention, I claim:—

1. The method of making a combined reamer and tap having reaming and threading portions arranged one in advance of the other, which consists in threading a suitable blank, milling flutes extending spirally in one direction along the tap portion of the blank, milling continuing flutes extending spirally in the reverse direction along the reaming portion of the blank, grinding out the ridges between the intersecting ends of the flutes, and then suitably finishing the surfaces of the tool.

2. The method of making a combined reamer and tap having reaming and threading portions arranged one in advance of the other, which consists in forming threads on the threading portion, milling flutes extending spirally in reverse directions along the reaming and threading portions, removing the ridges left by the milling tool at the points of intersection of the flutes, and then suitably finishing the surface of the tool.

3. The method of making a combined reamer and tap having reaming and threading portions arranged one in advance of the other, which consists in threading a suitable blank, milling flutes extending spirally in opposite directions along the reaming and threading portions of the blank, removing the ridges left by the milling tool between the intersecting ends of the flutes, grinding leads on the reamer and tap portions, reducing down the blank to a taper from a point between the ends of its threaded portion continuously to the extremity of its reaming portion, hardening the blank, and then suitably finishing the same.

4. The method of making a combined reamer and tap having rear reaming and front tap portions of the character described, which consists in cutting threads upon a circular blank continuously along the portion thereof which is to constitute the full tap portion of the tool, milling flutes extending spirally in one direction along the portion of the blank which is to constitute the reaming portion of the tool, milling continuing flutes extending spirally in the reverse direction along the tap portion, grinding out the ridges left between the intersecting ends of the flutes of said portions so as to make the hook and rake of the connected flutes uniform throughout their length, and then reducing down the blank so as to taper the tool longitudinally from a point intermediate of the length of the tap portion continuously to the forward extremity of the reaming portion.

In testimony whereof I affix my signature.

GORDON MARK BRUBAKER, JR.